United States Patent Office 3,476,567
Patented Nov. 4, 1969

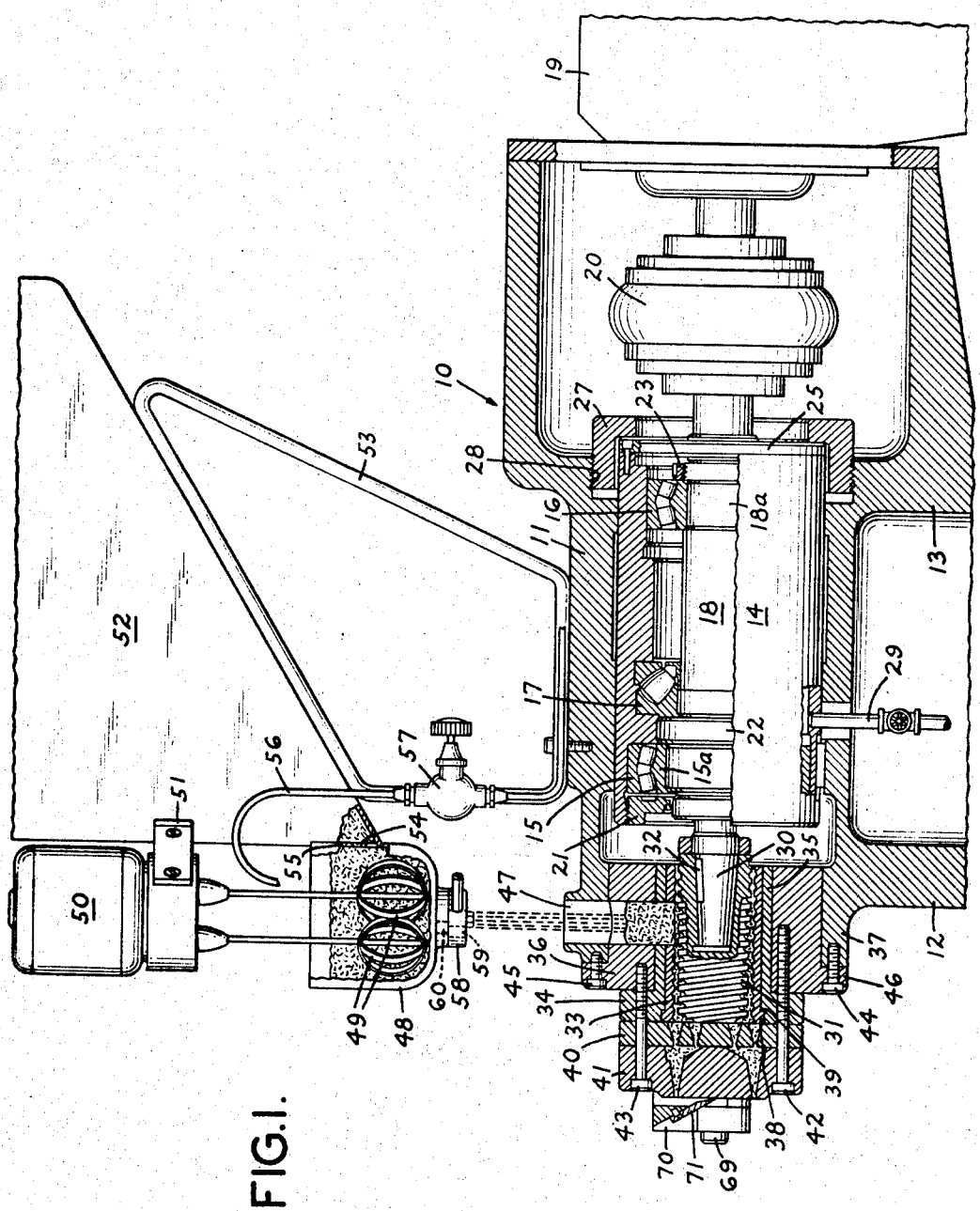

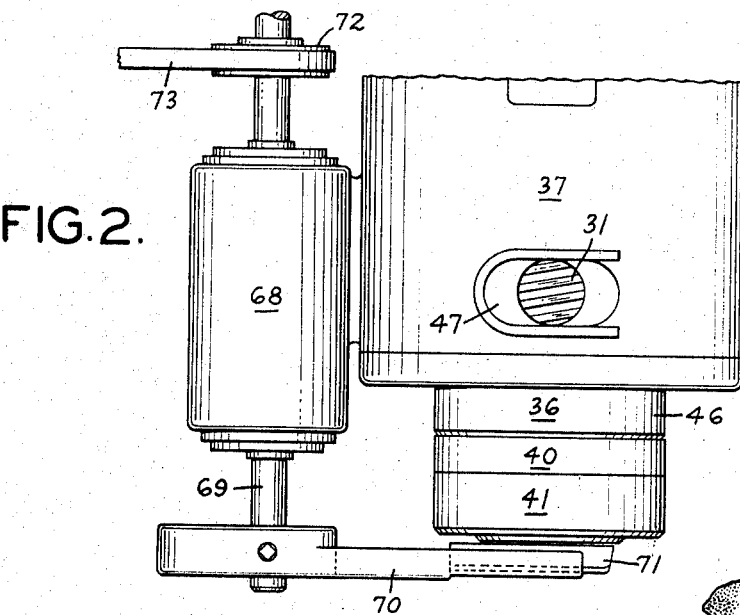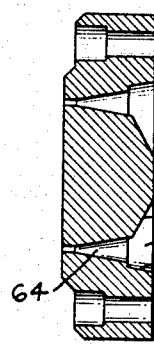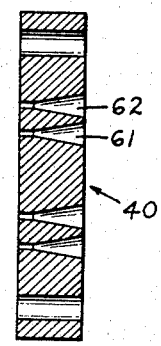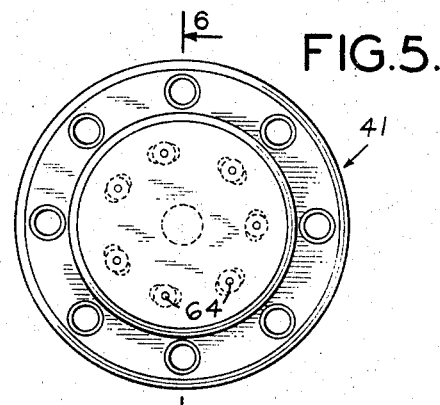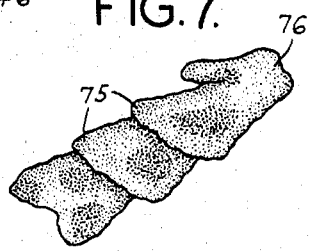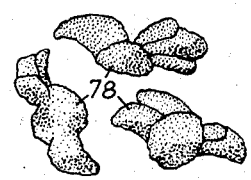

3,476,567
PROCESS FOR PREPARING EXPANDED
CORNMEAL EXTRUSIONS
David Hugh Wood, Jr., Vernon, N.Y., Grant Omer
Gibney, Kitchener, Ontario, Canada, and Richard
Smith, Oneida, N.Y., assignors to Helme Products,
Inc., New York, N.Y., a corporation of New Jersey
Filed Mar. 21, 1966, Ser. No. 535,974
Int. Cl. A23l 1/18
U.S. Cl. 99—82    6 Claims

ABSTRACT OF THE DISCLOSURE

In the representative embodiment of the invention described herein, a puffed corn product similar in appearance to popcorn is prepared by forcing cornmeal at a high velocity through orifices in an extrusion plate with an extrusion screw. The cornmeal is cooked as a result of the heat generated during working of the meal by the extrusion screw. During the high velocity extrusion, the meal expands nonuniformly, producing random lateral projections in the manner of popcorn and a cutting blade severs the material as it is extruded to provide popcorn-size pieces.

---

This invention relates to the production of puffed corn products, and more particularly to methods and apparatus for preparing puffed corn products having the appearance, texture and flavor of popcorn. Popcorn is prepared by heating kernels of popping corn until they explode. The apparatus used for popping corn varies from small, home corn poppers capable of popping batches of a few ounces to commercial continuous popping ovens capable of popping many hundred pounds of corn a day.

It is recognized that the quality of popcorn is subject to considerable variation. Thus, some types of popping corn produce relatively small kernels of popcorn, while others produce much larger kernels. Moreover, the number of kernels of popcorn which can be produced from a given number of kernels of popping corn also varies quite substantially for the reason that different grades of popping corn pop to a greater or less extent. With some types of popping corn, the number of unpopped kernels constitute a substantial proportion of the corn supplied to the popping apparatus. Some control over the popping qualities of popping corn can be obtained by adjusting their moisture content and the like, but nevertheless it is difficult to obtain a product of uniformly high quality even in large commercial operations.

Food products have been prepared heretofore by extruding and expanding cooked cornmeal to produce products which are of rod or nugget-like shapes and which may be used with butter, salt, cheese or candy coatings or the like as confections or snacks. Products of the type mentioned are produced with the apparatus and by the methods disclosed in the Graves et al. Patent No. 2,705,927, dated Apr. 12, 1955. These products do not resemble popcorn nor do they have the texture or eating qualities of popcorn for the reason that they are highly porous and have relatively large air cells therein separated by thin walls of the cooked cornmeal product.

In accordance with the present invention, a new food product is made by the heating, extrusion and expansion of cornmeal under suitable conditions whereby the porosity, texture, taste and appearance of the product are similar to popcorn.

More particularly, in accordance with the invention, it has been discovered that when white or yellow or a mixture of white and yellow cornmeal having a moisture content between about 10% and 12.3% is forced at high velocity, e.g., 950 to 1800 inches per minute, by means of a high pressure feeder through orifices in one or more extrusion plates, the cornmeal which is heated by the extruding operation is discharged in rods which resemble branches with numerous irregularly shaped buds extending from their sides in generally equally spaced clusters. By cutting these rods into small pieces as the rods are extruded, a product is obtained which has the appearance of popcorn, lacking only the hull which is normally attached to the popped kernels. The absence of the characteristic hulls is, however, an advantage inasmuch as they contribute nothing to the edibility or eating qualities of the popcorn and as a matter of fact, the hulls actually detract from the eating qualities of popcorn because of their tendency to lodge in the mouth and teeth.

The new product, while expanded by steam generated by the heating of the cornmeal during extrusion, is expanded more and has smaller cells in much larger number than the corn nuggets referred to above. In the new product, the cells are very small like those normally present in popcorn. The small cells contribute to the overall appearance of the product making it whiter and, as indicated above, providing eating qualities similar to popcorn.

As indicated above, the extrusion rate is considerably higher than the rates conventionally used for making the puffed corn nuggets so that extremely high production rates can be maintained with a material (ground cornmeal) which costs considerably less than popping corn. Accordingly, the new product can be made economically and at a lesser cost than popcorn. The new product, like popcorn, can be coated with butter and salt, cheese, caramel or the like, and suprisingly, has even better keeping qualities than popped popcorn, that is, the new product has a lesser tendency than popcorn to become tough and stale.

For a better understanding of the present invention, reference may be had to the accompanying drawings, in which:

FIGURE 1 is a front elevational view, partly broken away and partly in section, of an apparatus for practicing the invention;

FIGURE 2 is a top plan view of a portion thereof and showing the cutoff knife therein;

FIGURE 3 is a front elevational view of an inner die plate of the apparatus;

FIGURE 4 is a view in section taken on line 4—4 of FIGURE 3;

FIGURE 5 is a front elevational view of an outer die plate;

FIGURE 6 is a view in section taken on line 6—6 of FIGURE 5;

FIGURE 7 is a perspective view of an uncut extrusion produced by the extruding apparatus in accordance with the present invention; and FIGURE 8 is a perspective view of a group of puffed products made in accordance with the present invention.

By way of illustration of an apparatus suitable for producing puffed cornmeal products of the type embodying the invention, FIGURE 1 discloses an extruder including a frame 10 in the form of a casting or a fabricated assembly having a tubular midportion 11 and downwardly extending supporting portions 12 and 13 may be provided with legs or the like for mounting on the floor. Within the tubular portion 11 is mounted a cylindrical bearing housing 14 in which are mounted a pair of roller bearings 15 and 16 and a roller thrust bearing 17 which support a drive shaft 18 for rotation by means of an electric drive motor 19 and an interposed flexible coupling 20 of the conventional type. A collar 21 having an oil seal engages the bearing 15 to retain it against axial movement and the inner races 15a of the bearing 15 and the thrust bearing 17 engages opposite sides of a flange 22 on the drive shaft 18. The other roller bearing 16 has its inner race mounted on a reduced section 18a of the shaft 18 to which it is clamped by means of a ring nut 23 while the outer race of the bearing 16 is supported by the housing.

A cover plate or ring 25 in sealing engagement with the shaft 18 is secured to the end of the bearing housing 14 and a ring nut 27 engages the cover plate 25 and is threaded into the threaded counterbore 28 in the cylindrical section 11 to retain the bearing housing 14 against shifting movement to the right as viewed in FIGURE 1. Insertion and removal of the bearing housing 14 and shaft 18 is facilitated by the ring nut 27. An oil line 29 communicates with the interior of the bearing housing to supply oil to the bearings therein.

The left hand end of the drive shaft has a tapered shaft section 30 which engages with a press fit in a complementally shaped opening extending axially of an externally threaded feed screw 31. A key 32 fixes the screw against rotation relative to the reduced shaft section 30.

A tubular internally grooved sleeve 33 receives the screw 31 closely whereby rotation of the screw will advance material through the sleeve with a substantially positive feed and pressure.

An adapter sleeve 34 receives the sleeve 33 tightly and has an outwardly extending flange 35 at one end which abuts against an annular filler ring 36 fitting in a ring-like portion 37 of the frame 10. A flange 38 on the sleeve 33 and a recess 39 in the end of the adapter sleeve retain the sleeve 33 against movement to the right with respect to the adapter ring. It will be understood that sleeve 33, sleeve 34 and ring 36 can be combined to form one element, if desired. Mounted on the outer end of the adapter ring is an inner die member 40 to be described in greater detail hereinafter and an outer sizing die 41, these dies being secured to the adapter ring 35 and the filler ring 36 by means of a plurality of machine screws 42, 43, etc. The filler ring is also secured to the frame by means of a plurality of machine screws 44, 45, extending through a flange 46 on the filler ring and into the end of the section 37 of the frame. A feed opening 47 is formed through the upper side of the frame section 37, the filler ring 34, the adapter 36 and the sleeve 33 to enable material to be introduced into the grooves in the screw 31 and the sleeve 33.

Above the filling opening 47 is a mixer including bowl 48 and a pair of rotary mixers 49 therein driven by means of a motor 50. A bracket 51 supports the motor 50 on a hopper 52 adapted to receive cornmeal. A frame member 53 of bent rod or tubing or of any other suitable type supports the hopper 52 on the top of the frame 10. Cornmeal can be supplied to the mixing bowl from the hopper 52 through an opening 54 in the lower corner of the hopper 52. A slide valve 55 is provided for shutting off the flow of the cornmeal into the bowl 48. Water is supplied to the bowl by means of a pipe 56 connected to a suitable source of water and having a regulating valve 57 therein. At the bottom of a bowl 48 is a rotary feed control member 58 having a passage 59 therein which may be moved into, out of or partly out of alignment of an opening 60 in the bottom of the mixing bowl whereby the rate of discharge of the cornmeal can be controlled.

The extrusion die 40 is best shown in FIGURES 3 and 4 and is a disk-like member formed of steel or the like having in the form illustrated two annular rows of holes 61 and 62 through which the cornmeal is extruded. The plate illustrated has thirty such holes, the diameter of the inner end of each hole being approximately ⅜ of an inch and the discharge end being approximately 3/16 of an inch in diameter.

The outer die or sizing plate 41, as illustrated, has seven holes 64 therein having outer ends with a diameter of 3/16 of an inch. The inner diameter of each hole is approximately ½ inch and communicates with a shallow annular holding or collecting chamber 65 which, as shown in FIGURE 6, has an inner diverging conical wall 66 and an outer converging wall 67 whereby the material extruded through the die plate 40 is distributed uniformly or substantially so to the extruding and sizing apertures 64.

The apparatus includes means for cutting material extruded through the plate 41 into shorter lengths. To that end, the frame section 37 supports a bearing housing 68 containing bearings, not shown, supporting a shaft 69 for rotation. One end of the shaft 69 carries an arm 70 having an inclined shearing blade 71 thereon for movement across in the face of the die plate 41 in contact therewith or substantially so in order to cut the extruded material into short lengths. A pulley 72 is fixed to the opposite end of the shaft 69 and is driven by means of a belt 73 and separate variable speed motor, not shown.

In a typical operation with the apparatus described, cornmeal of a predetermined grit size is charged into the hopper 52. Both yellow and white dent cornmeal are suitable or mixtures of the yellow and white cornmeal may be used, if desired. The white cornmeal appears to have slightly better expansion when treated as described hereinafter. The cornmeal or mixture of cornmeals should have a moisture content between about 10% and 12.3%. A moisture content as close as possible to 11% produces the best results.

The grit size is important for it has been found that cornmeal having grit size in which 20% or more remains on a U.S. No. 12 screen causes low expansion of the product and gives it a rather tough texture. Fines in excess of 3 to 5% through a No. 40 screen causes a poor flow of the grits and may cause stoppage of the machine.

If necessary, additional moisture can be added to the corn meal grits in the mixing bowl 48 by means of the water pipe 56 and control valve 57 so that a moisture content in the range indicated above is present in the grits which are discharged at a controlled rate by means of the regulator 58 into the feed opening 47. The agitators 49 prevent bridging of the grits in the mixer and assure steady feeding of the grits. The screw 31 is driven at such a speed that as cornmeal grits are forced through the die plates 40 and 41, the high pressure and friction developed therein heats the grits to a temperature of about 250° to 400° F. During the starting of the apparatus, the die plates may be heated by external heating means to a temperature of about 250° a typical operation with apparatus of the type described develops and maintains a temperature of about 365° F. Development of such temperature in the cornmeal cooks the cornmeal and renders it plastic so that it flows through the collecting or holding chamber 65 and is discharged through the sizing and extruding openings 64 in the form of rods or strands. The screw 31, is accordance with the invention, should be driven at such a speed that the strands or rods are extruded at the rate of between 950 and 1800 inches per minute, a high extrusion rate capable of developing and maintaining the temperatures indicated above in the cornmeal undergoing working and cooking in the die plates. As shown in FIGURE 7, the uncut product extruded from each opening 64 in the sizing die 41 is not an expanded rod of generally cylindrical shape. On the contrary, the expansive force of the steam in the plastic cooked cornmeal causes small bud-like or leaf-like protrusions 75 to form along the length of the rod 76 issuing from each of the openings 64. These clusters of leaf-like or bud-like extensions do not resemble the exploded kernels of popping corn very closely. However, when the leading end of extruded material is cut off as it is extruded from the die openings, the successive portions of the extrusion flare out in all directions because of relief of pressure thereon and popcorn-like products 78 are formed, as shown in FIGURE 8. In order to cut the extruded material into pieces of a size corresponding to popped kernels, the cutoff knife 71 is driven at a rate of about 1000 to 2000 cuts per minute. By properly regulating the knife speed, the resulting products are of a suitable size and are flared in one end and sealed at the other in the characteristic shape of popped popcorn.

It has been found that the size of the collecting pocket 65 and the extrusion rate must be regulated closely. If the plastic cornmeal is retained in the dies too long, the product will have a dark, off-color appearance. By locating the collecting or holding pocket 65 at the inner end of the passages or openings 64, the residence time of the plasticized cornmeal can be reduced so that the discoloration of the product is avoided. Moreover, by forming the openings 64 of conical shape with a wider inner end, the heat buildup reaches its peak near the outer end of the die orifice where residence time of the product is very short, whereby aiding in the preparation of a product having a true white color.

It will be understood that the apparatus for practicing the process is susceptible to modification as, for example, in the number of extrusion openings and their arrangement in the die plates 40 and 41. However, it is advantageous to use a relatively small number of extrusion openings in the die plate 41 to attain the desired extrusion rate and produce the lateral expansion or explosion of the extrusion to give it the characteristic popcorn configuration. Large numbers of smaller holes are less satisfactory because of the small size of the grains produced at the required extrusion rate. Also, it will be understood that only one or more than two die plates may be used so long as they are capable of producing the necessary high temperature for plasticizing and cooking the cornmeal and allowing extrusion thereof at the required extrusion rate while avoiding residence time that will cause discoloration of the product.

We claim:

1. A method of making expanded corn products comprising forcing cornmeal under pressure through restricted openings at a high velocity between about 950 and 1800 linear inches per minute to heat said cornmeal to between about 250° F. and 400° F., and cook and plasticize said cornmeal, said cornmeal containing between about 10.0% and 12.3% moisture, relieving said extruded cooked cornmeal of pressure suddenly by passing it at said high velocity from the restricted openings into an unrestricted environment to expand it irregularly and produce extrusions having random protrusions extending laterally beyond the minimum cross-section of the extrusions, and cutting said extrusions laterally into short irregularly shaped pieces simulating popcorn.

2. The method set forth in claim 1 in which said cornmeal has a particle size so that less than about 20% remains on a No. 12 screen and no more than about 3 to 5% passes through a No. 40 screen.

3. The method set forth in claim 1 in which said cornmeal has a moisture content of about 11%.

4. The method set forth in claim 1 in which said cornmeal has a particle size so that less than about 20% remains on a No. 12 screen and no more than about 3 to 5% passes through a No. 40 screen and a moisture content of about 11%.

5. The method set forth in claim 1 in which said extrusions are cut at a rate of between about 1000 and 2000 cuts per minute.

6. The method set forth in claim 1 in which said cornmeal has a particle size so that less than about 20% remains on a No. 12 screen and no more than about 3 to 5% passes through a No. 40 screen and a moisture content of about 11%, and cutting said extrusions at a rate between about 1000 and 2000 cuts per minute.

References Cited
UNITED STATES PATENTS

| | | |
|---|---|---|
| 2,705,927 | 4/1955 | Graves et al. |
| 2,842,072 | 7/1958 | Graves et al. _____ 99—81 XR |
| 3,104,975 | 9/1963 | Bowman _____ 99—81 |

RAYMOND N. JONES, Primary Examiner